United States Patent
Hsu (10) Patent No.: US 8,887,892 B2
(45) Date of Patent: Nov. 18, 2014

(54) CHAIN FOR ROLLING ELEMENTS

(71) Applicant: Chieftek Precision Co., Ltd., Tainan (TW)

(72) Inventor: Ming-che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 37 days.

(21) Appl. No.: 13/777,716

(22) Filed: Feb. 26, 2013

(65) Prior Publication Data

US 2014/0060996 A1 Mar. 6, 2014

(30) Foreign Application Priority Data

Sep. 3, 2012 (TW) .............................. 101132005 A (51) Int. Cl.
*B65G 13/00* (2006.01)
*F16C 29/06* (2006.01)
*F16C 33/38* (2006.01)
*B65G 39/12* (2006.01)

(52) U.S. Cl.
CPC ............. *F16C 33/3825* (2013.01); *B65G 39/12* (2013.01); *F16C 2240/60* (2013.01); *F16C 29/06* (2013.01)
USPC .............................................. 193/37; 384/51

(58) Field of Classification Search
CPC ...... F16C 29/06; F16C 33/38; F16C 33/3812; F16C 33/3856; F16C 33/3887
USPC ........... 198/779; 193/35 MD, 37; 384/43–45, 384/51, 523–534, 572–580
See application file for complete search history.

(56) References Cited

U.S. PATENT DOCUMENTS

| | | | |
|---|---|---|---|
| 2,665,958 A * | 1/1954 | Waldherr, Jr. .................. | 384/527 |
| 3,486,212 A * | 12/1969 | Vannest .................... | 29/898.067 |
| 5,391,126 A * | 2/1995 | Fukushima et al. ............ | 476/46 |
| 6,364,086 B1 | 4/2002 | Blaurock et al. | |
| 7,150,564 B2 * | 12/2006 | Lee ................................. | 384/45 |
| 7,419,302 B2 * | 9/2008 | Matsumoto ..................... | 384/45 |
| 7,465,092 B2 * | 12/2008 | Hsu et al. ........................ | 384/43 |
| 7,563,029 B2 * | 7/2009 | Wu et al. ......................... | 384/51 |
| 7,802,922 B2 * | 9/2010 | Chen .............................. | 384/51 |
| 8,297,843 B2 * | 10/2012 | Hsu ................................ | 384/45 |
| 8,408,796 B1 * | 4/2013 | Hsu ................................ | 384/45 |
| 8,414,192 B2 * | 4/2013 | Sekimoto et al. ............. | 384/523 |

FOREIGN PATENT DOCUMENTS

TW 201122262 7/2011

* cited by examiner

*Primary Examiner* — William R Harp
(74) *Attorney, Agent, or Firm* — Muncy, Geissler, Olds & Lowe, P.C.

(57) ABSTRACT

A chain for rolling elements includes a carrier belt having first and second side strip on two sides thereof, and multiple holes are defined in the carrier belt and located between the first and second side strips. Each hole has a first opening end and a second opening end. Multiple retainers are connected to the carrier belt and located alternatively with respect to the holes. Multiple first ribs are connected between the first side strip and the retainer. Multiple second ribs are connected between the second side strip and the retainer. Each of the first and second side strips has a thickness T1, and each of the first and second ribs has a thickness T2 which is smaller than T1. The first and second ribs reinforce connections between the first and second side strips and the retainers so that the chain has even flexibility and can operate smoothly.

6 Claims, 11 Drawing Sheets

CHAIN FOR ROLLING ELEMENTS

FIELD OF THE INVENTION

The present invention relates to a chain for rolling elements, and more particularly, to a carrier belt with holes and retainers connected alternatively to each other along the longitudinal direction of the carrier belt and having ribs so as to improve the connecting stiffness between strips and retainers and keep the flexibility of the chain to be even.

BACKGROUND OF THE INVENTION

The conventional chain for rolling elements usually comprises multiple balls rotatably retained in the holes of the carrier belt and between retainers. The adjacent balls do not interfere to each other and the chain is used for high speed circulation movement of precise mechanism such as linear slide assembly.

Figure 10:
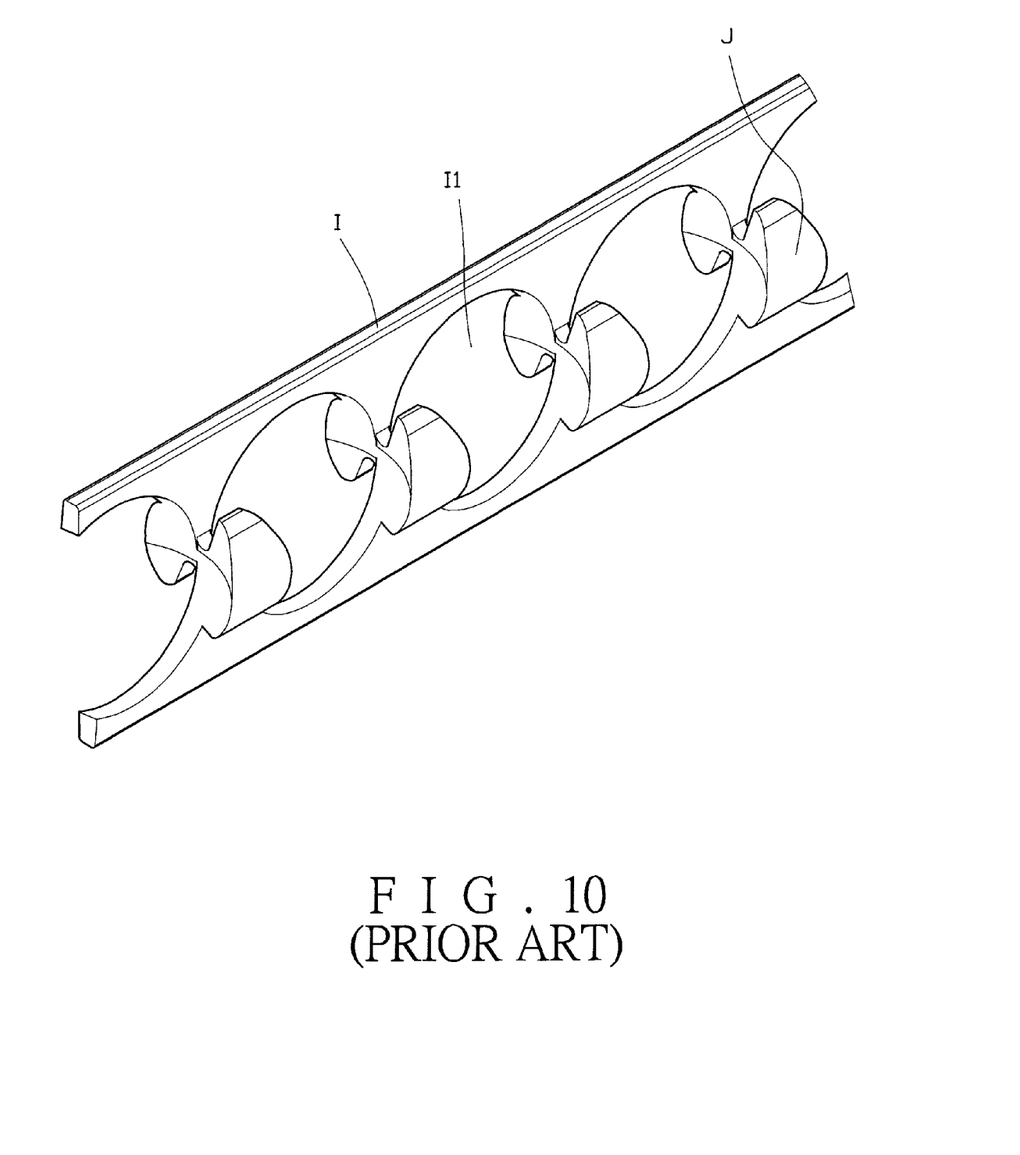
FIG. 10 is a perspective view to show the conventional chain.
Figure 11:
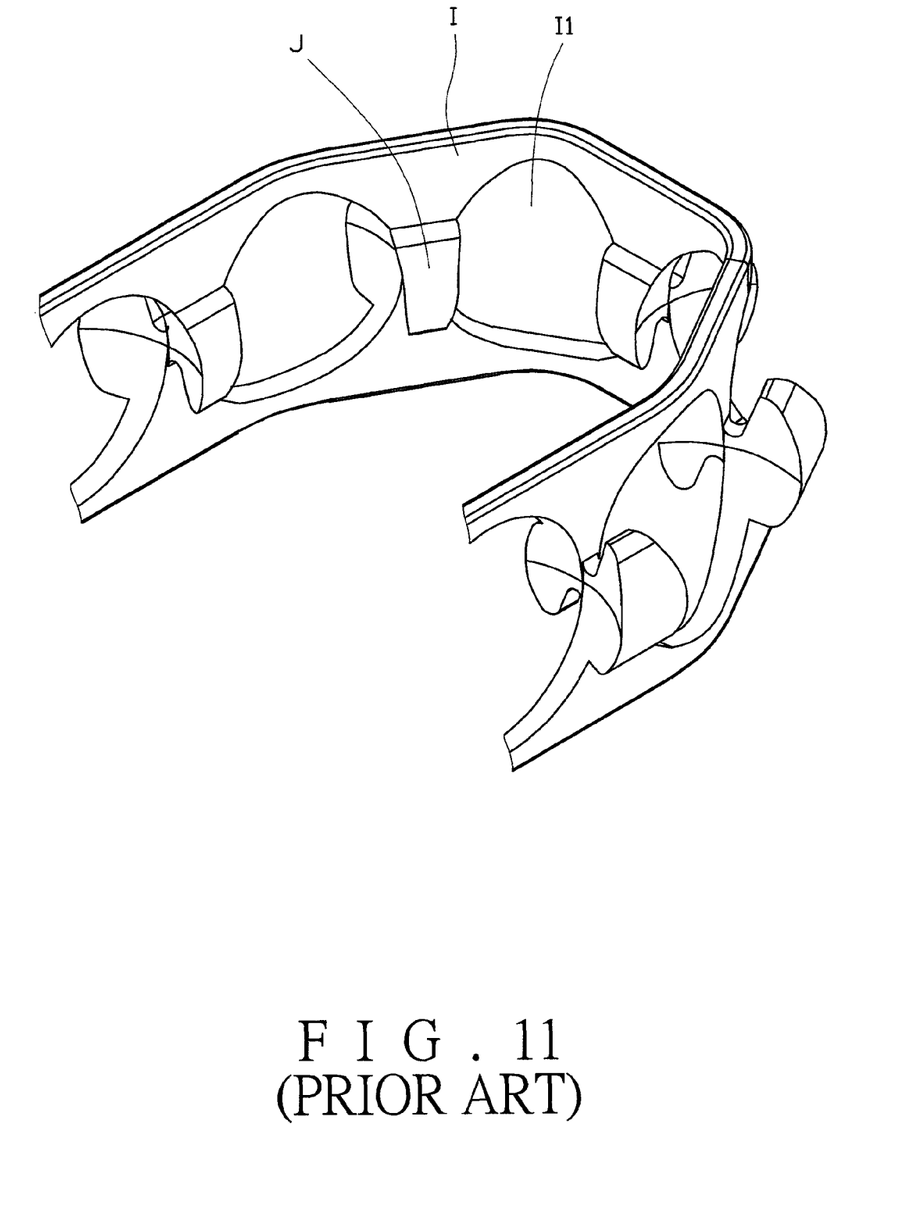
FIG. 11 shows that the conventional chain forms a curve.
Figure 12:
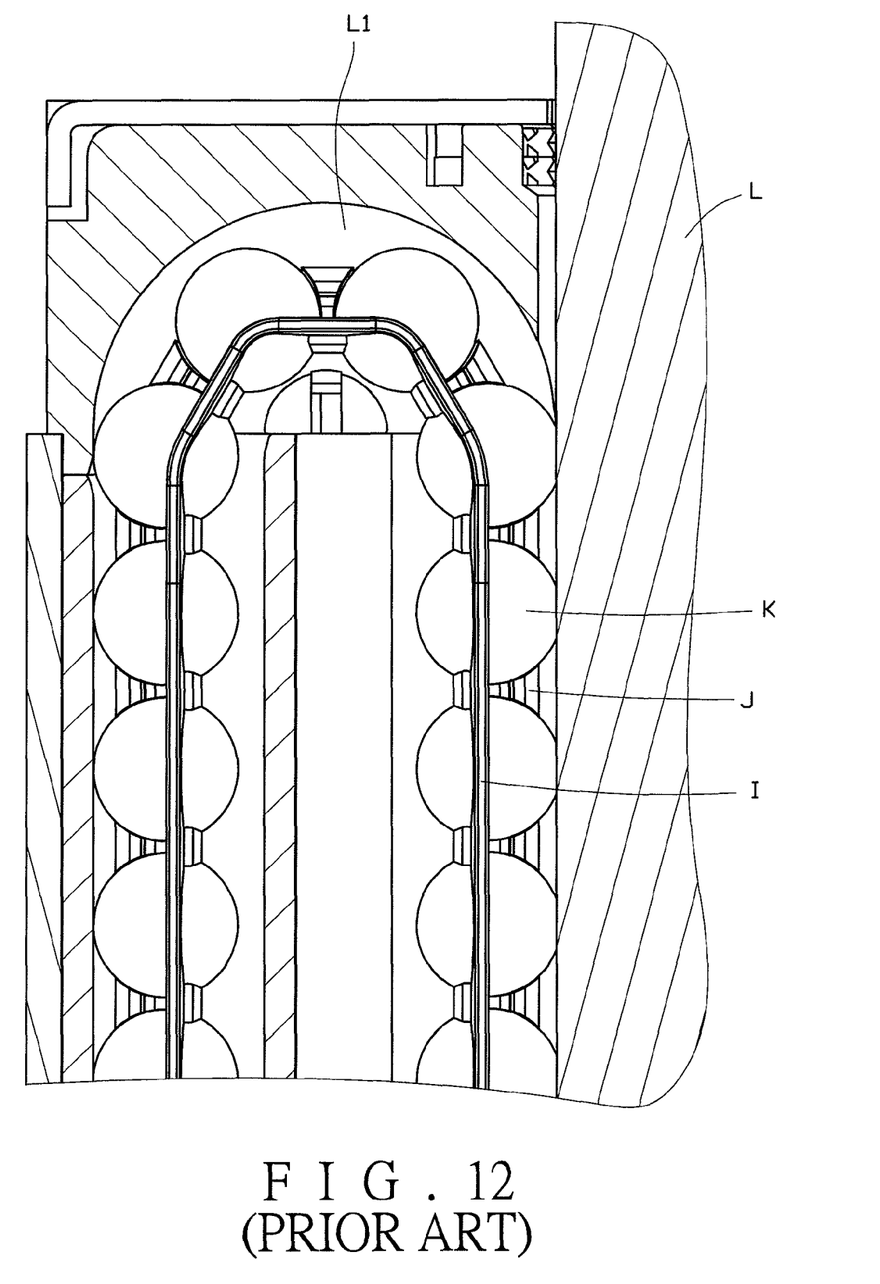
FIG. 12 shows that the conventional chain is used in a slide assembly and passing through a turning portion of the slide assembly.

As shown in FIGS. 10 to 12, the Taiwan Patent Application No. 201122262 discloses a chain which comprises a carrier belt "I" and multiple holes "I1" are defied along the longitudinal direction of the carrier belt "I" so as to receive balls "K" in the holes "I1". Multiple retainers "J" are alternatively located between the holes "I1" so as to separate the balls "K" to ensure that the balls "K" to operate smoothly. However, the thickness of the chain varies in different sections along the longitudinal direction so that when the chain moves over a turning path "L1", the carrier belt "I" cannot smoothly pass through the turning path "L1" and affects the operation of the chain.

U.S. Pat. No. 6,364,086 discloses a chain of rolling elements which comprises two side strips and multiple retainers. The multiple retainers are connected between the two side strips so as to form multiple holes. Wherein, when balls are received in the holes, there are gaps between the retainers and the balls so that when the chain moves over the turning path "L1", the gaps allow the chain to have more flexibility. Consequently, the carrier belt "I" can smoothly pass through the turning path "L1". Nevertheless, comparing to the Taiwan Patent Application No. 201122262, the connection portion between the side strips and the retainers are weaker and suffered by significant pressure such that shorten the life of the chain.

The present invention intends to provide a chain for rolling elements which have better flexibility and strength and longer life so as to bear higher operation speed and heavier operation load and improve the shortcomings of the conventional chain for rolling elements.

SUMMARY OF THE INVENTION

The present invention relates to a chain for rolling elements and comprises a carrier belt having first and second side strip on two sides thereof, and multiple holes are defined in the carrier belt and located between the first and second side strips. Each hole has a first opening end and a second opening end. Multiple retainers are connected to the carrier belt and located alternatively with respect to the holes. Multiple first ribs are connected between the first side strip and the retainer. Multiple second ribs are connected between the second side strip and the retainer. Each of the first and second side strips has a thickness and each of the first and second ribs has a thickness T2 which is smaller than T1. The first and second ribs reinforce connections between the first and second side strips and the retainers so that the chain has even flexibility. The preferable thickness T1 is larger than 0.1 mm to easily manufacturing the chain by way of injection molding, and the preferable ratio between T2/T1 is less than 50% for providing better flexibility of the chain.

Preferably, the thickness of each of the first ribs increases from the first opening end toward the second opening end of the hole corresponding thereto, and the thickness of each of the second ribs increases from the second opening end toward the first opening end of the hole corresponding thereto. Alternatively, the thickness of each of the first and second ribs increases from the mediate portion of each of the first and second side strips toward the first and second opening ends of the hole.

Preferably, a straight side or a curved side is formed on the first and second ribs and located adjacent to the holes corresponding thereto.

Preferably, the thickness of each of the first ribs increases from the retainer connected to the first rib toward a direction away from the retainer. The thickness of each of the second ribs increases from the retainer connected to the second rib toward a direction away from the retainer.

The first and second ribs reinforce connections between the first and second side strips and the retainers so that the chain has even flexibility. When the chain is used for a linear slide assembly, the chain of the present invention easily passes through the turning portion at high speed.

The chain of the present invention can bear higher load and operates at higher speed than the conventional one.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
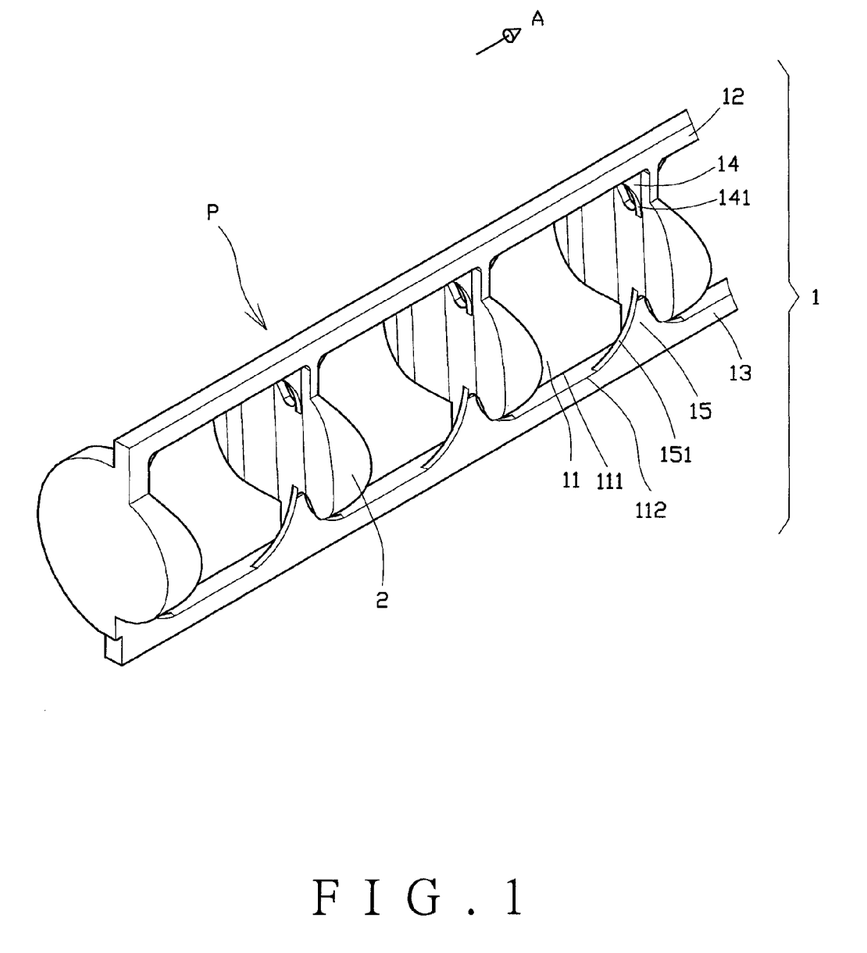
FIG. 1 is a perspective view to show the chain of the present invention.
Figure 2:
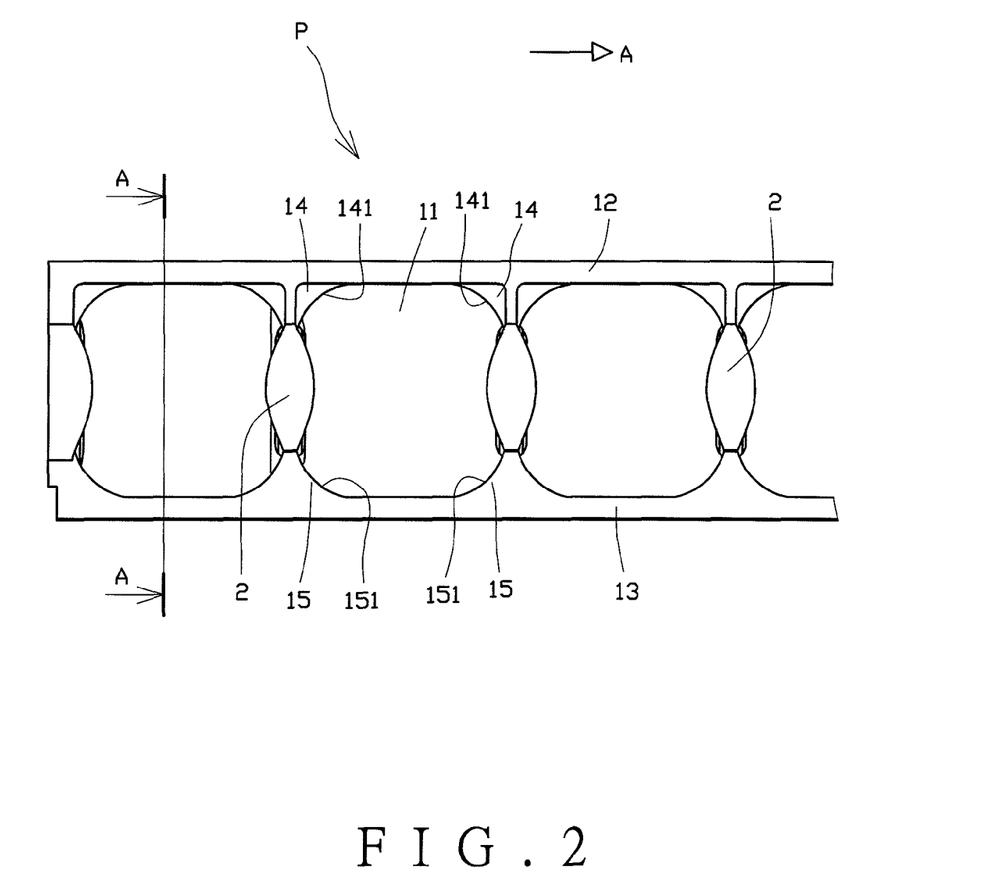
FIG. 2 is a plane view of the chain of the present invention.
Figure 3:
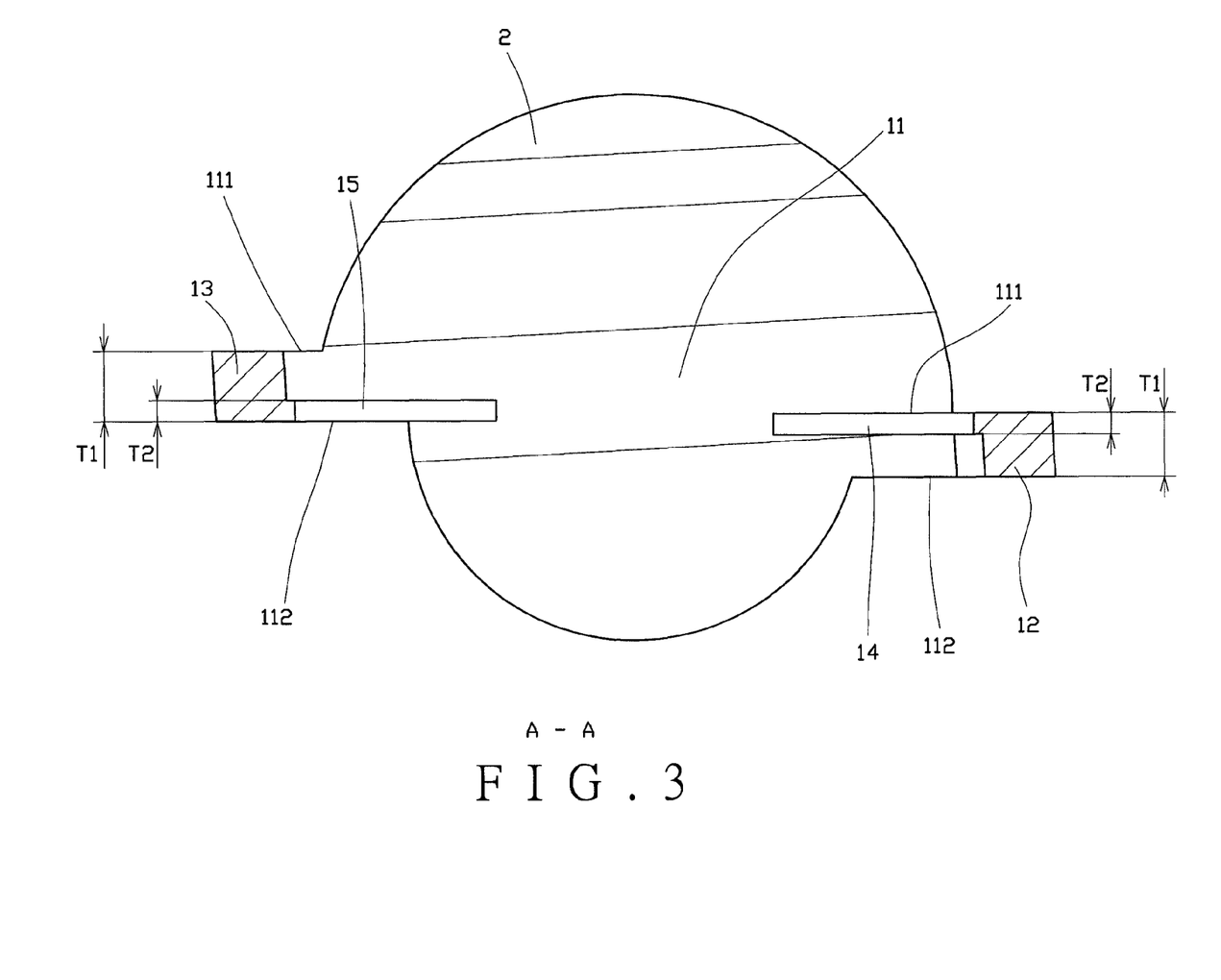
FIG. 3 is a cross sectional view taken along line A-A of FIG. 2.

Referring to FIG. 1, the chain "P" for rolling elements of the present invention comprises a flat carrier belt 1 which extends along the longitudinal direction "A" and has a first side strip 12 and a second side strip 13 on two sides thereof. Multiple holes 11 are defined in the carrier belt 1 along the longitudinal direction "A" and located between the first and second side strips 12, 13. The first and second side strips 12, 13 are located adjacent to the holes 11. Each hole 11 has a first opening end 111 and a second opening end 112, and multiple retainers 2 are connected to the carrier belt 1 and located alternatively with respect to the holes 11. Multiple first ribs 14 are connected between the first side strip 12 and the retainer 2, and each of the first ribs 14 is located adjacent the hole 11 corresponding thereto. Multiple second ribs 15 are connected between the second side strip 13 and the retainer 2, and each of the second ribs 15 is located adjacent the hole 11 corresponding thereto. Each of the first and second side strips 12, 13 has a thickness T1, and each of the first and second ribs 14, 15 has a thickness T2 which is smaller than T1. Preferably, thickness T1 is larger than 0.1 mm to easily manufacture the chain by way of injection molding, and the preferable ratio between T2/T1 is less than 50% for providing better flexibility of the chain "P". As shown in FIG. 2, a first curved side 141 is formed on the first rib 14 and located adjacent to the hole 11 corresponding thereto. A second curved side 151 is formed on the second rib 15 and located adjacent to the hole 11 corresponding thereto. As shown in FIG. 3, the thickness T2 of each of the first ribs 14 increases from the first opening end 111 toward the second opening end 112 of the hole 11 corresponding thereto. The thickness T2 of each of the second ribs 15 increases from the second opening end 112 toward the first opening end 111 of the hole 11 corresponding thereto.

Figure 4:
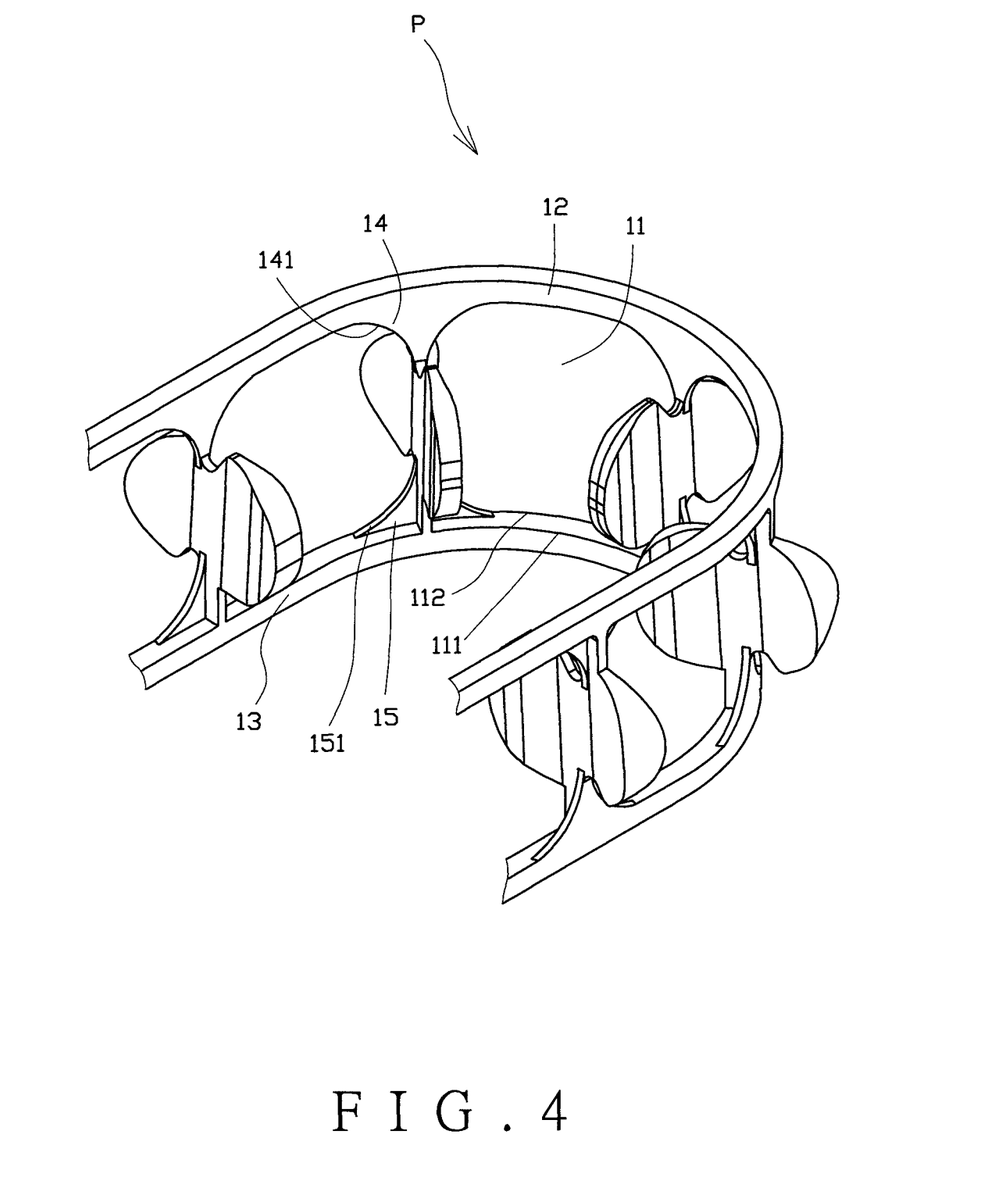
FIG. 4 shows that the chain of the present invention forms a curve.
Figure 5:
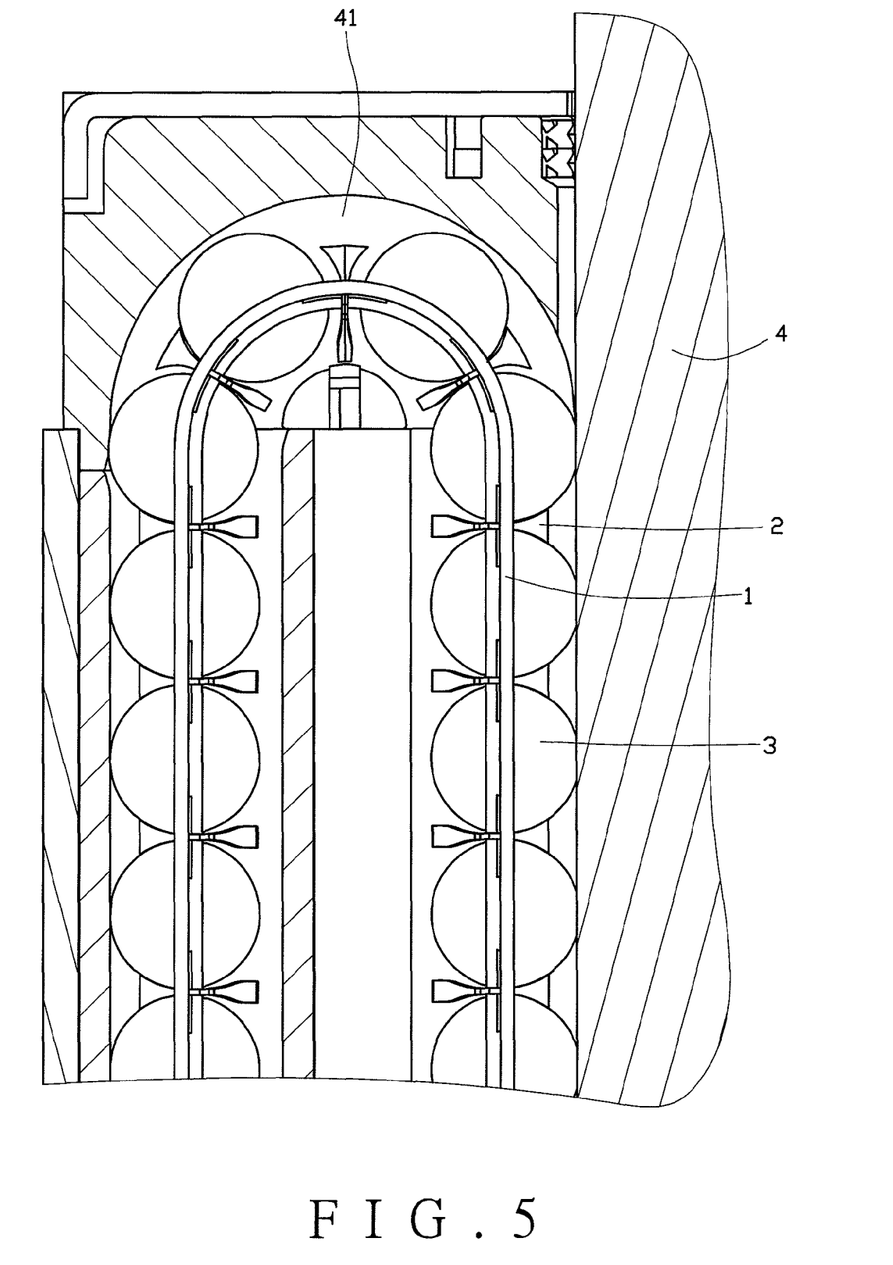
FIG. 5 shows that the chain of the present invention is used in a slide assembly and passing through a turning portion of the slide assembly.

As shown in FIG. 4, the first rib 14 is connected between the first side strip 12 and the retainer 2, and the second rib 15 is connected to the second side strip 13 and the retainer 2. Wherein, the first and second ribs 14, 15 reinforce the connections between the first and second side strips 12, 13 and the retainers 2 so that the flat carrier belt 1 and chain have even flexibility and can form smooth curves. As shown in FIG. 5, the chain "P" having the balls 3 is installed in the circulating passage/loop-like track of the linear slide assembly 4. When the chain "p" with balls 3 passes through the turning portion 41 of the circulating passage, the flat carrier belt 1 forms a smooth curve in the turning portion 41. Therefore, the stability and smoothness of the chain "p" during the passing of the turning portion 41 are improved. Further, because of the reinforcement of the connections between the first and second side strips 12, 13 and the retainers 2, the chain "P" can bear higher load and move at higher speed than the conventional one in the linear slide assembly 4.

Figure 6:
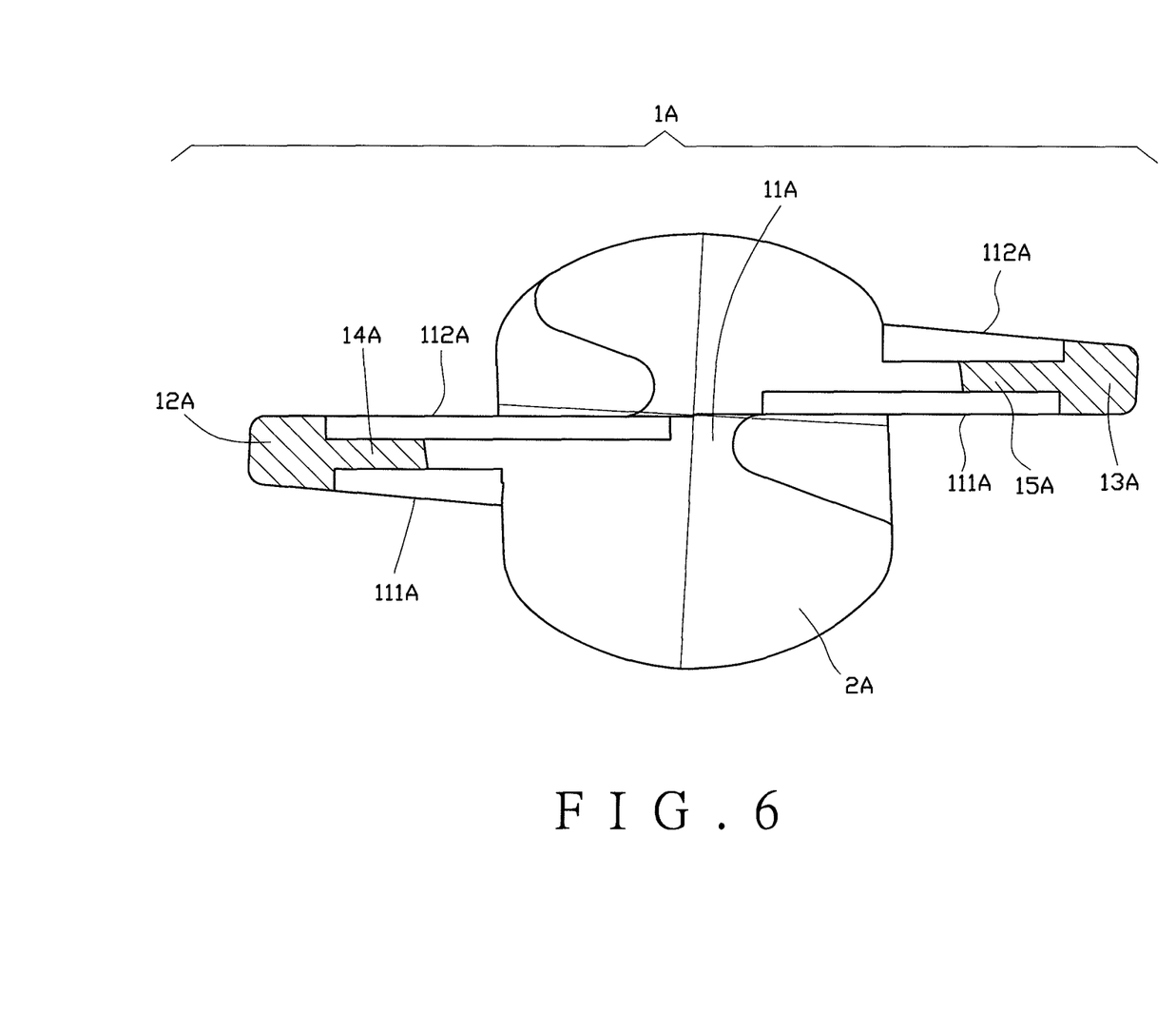
FIG. 6 shows a portion of the second embodiment of the chain of the present invention.

FIG. 6 shows the second embodiment, wherein the chain comprises a flat carrier belt 1A which has a first side strip 12A and a second side strip 13A on two sides thereof. Multiple holes 11A are defined in the carrier belt 1A and located between the first and second side strips 12A, 13A. The first and second side strips 12A, 13A are located adjacent to the holes 11A. Each hole 11A has a first opening end 111A and a second opening end 112A, and multiple retainers 2A are connected to the carrier belt 1A and located alternatively with respect to the holes 11A. Multiple first ribs 14A are connected between the first side strip 12A and the retainer 2A, and each of the first ribs 14A is located adjacent the hole 11A corresponding thereto. Multiple second ribs 15A are connected between the second side strip 13A and the retainer 2A, and each of the second ribs 15A is located adjacent the hole 11A corresponding thereto. The thickness of each of the first and second ribs 14A, 15A increases from the mediate portion of each of the first and second side strips 12A, 13A toward the first and second opening ends 111A, 112A of the hole 11A.

Figure 7:
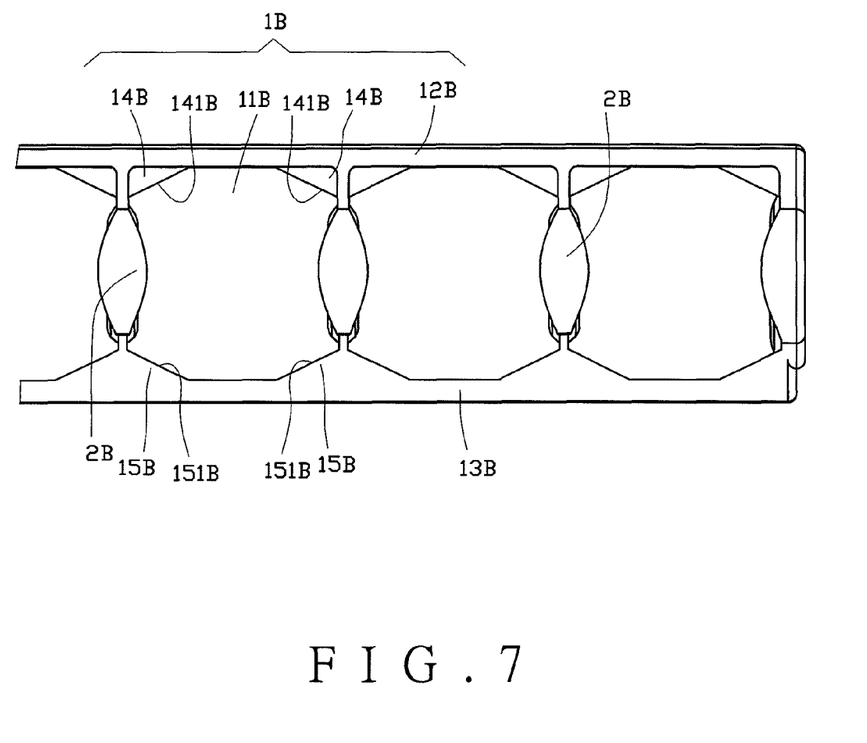
FIG. 7 shows a portion of the third embodiment of the chain of the present invention.

FIG. 7 shows the third embodiment, wherein the chain comprises a flat carrier belt 1B which has a first side strip 12B and a second side strip 13B on two sides thereof. Multiple holes 11B are defined in the carrier belt 1B and located between the first and second side strips 12B, 13B. The first and second side strips 12B, 13B are located adjacent to the holes 11B. Multiple retainers 2B are connected to the carrier belt 1B and located alternatively with respect to the holes 11B. Multiple first ribs 14B are connected between the first side strip 12B and the retainer 2B, and each of the first ribs 14B is located adjacent the hole 11B corresponding thereto. Multiple second ribs 15B are connected between the second side strip 13B and the retainer 2B, and each of the second ribs 15B is located adjacent the hole 11B corresponding thereto. A first straight side 141B is formed on the first rib 14B and located adjacent to the hole 11B corresponding thereto. A second straight side 151B is formed on the second rib 15B and located adjacent to the hole 11B corresponding thereto. The carrier belt 1B can generate smooth curves.

Figure 8:
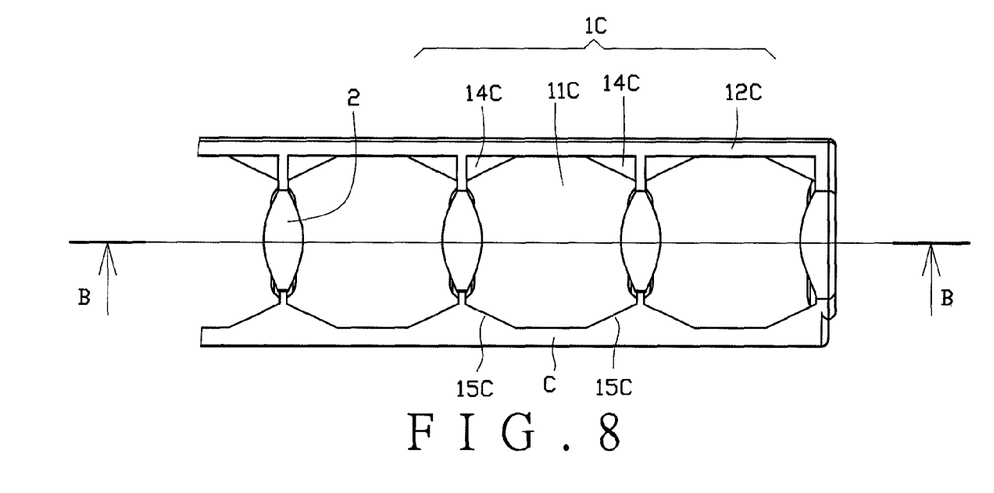
FIG. 8 shows a portion of the fourth embodiment of the chain of the present invention.
Figure 9:
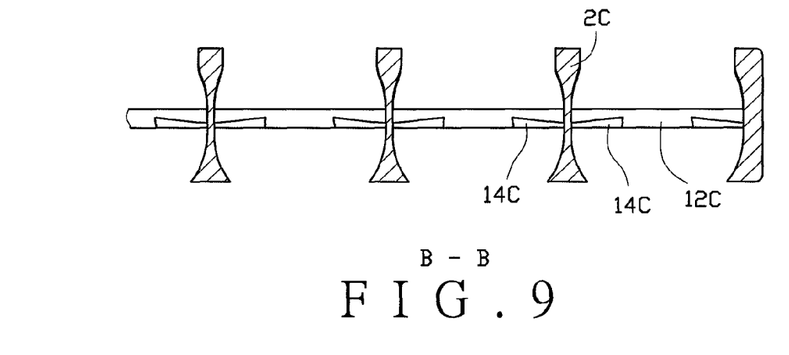
FIG. 9 is a cross sectional view taken along line B-B of FIG. 8.

FIGS. 8 and 9 shows the fourth embodiment, wherein the chain comprises a flat carrier belt 1C which has a first side strip 12C and a second side strip 13C on two sides thereof. Multiple holes 11C are defined in the carrier belt 1C and located between the first and second side strips 12C, 13C. The first and second side strips 12C, 13C are located adjacent to the holes 11C. Multiple retainers 2C are connected to the carrier belt 1C and located alternatively with respect to the holes 11C. Multiple first ribs 14C are connected between the first side strip 12C and the retainer 2C, and each of the first ribs 14C is located adjacent the hole 11C corresponding thereto. Multiple second ribs 15C are connected between the second side strip 13C and the retainer 2C, and each of the second ribs 15C is located adjacent the hole 11C corresponding thereto. The thickness of each of the first ribs 14C increases from the retainer 2C connected to the first rib 14C toward the direction away from the retainer 2C. The thickness of each of the second ribs 15C increases from the retainer 2C connected to the second rib 15C toward the direction away from the retainer 2C. The carrier belt 1C therefore may have more even flexibility and can form smoother curves than the previous embodiments of the chain.

While we have shown and described the embodiment in accordance with the present invention, it should be clear to those skilled in the art that further embodiments may be made without departing from the scope of the present invention.

What is claimed is:

1. A chain for rolling elements, comprising:
a flat carrier belt having a first side strip and a second side strip on two sides thereof, multiple holes defined in the carrier belt and located between the first and second side strips, each hole having a first opening end and a second opening end, multiple retainers connected to the carrier belt and located alternatively with respect to the holes, multiple first ribs connected between the first side strip and the retainer, each of the first ribs located adjacent the hole corresponding thereto, multiple second ribs connected between the second side strip and the retainer, each of the second ribs located adjacent the hole corresponding thereto, each of the first and second side strips having a thickness T1, and each of the first and second ribs having a thickness T2 which is smaller than T1, wherein the thickness of each of the first ribs increases from the first opening end toward the second opening end of the hole corresponding thereto, the thickness of each of the second ribs increases from the second opening end toward the first opening end of the hole corresponding thereto.

2. The chain as claimed in claim 1, wherein a straight side or a curved side is formed on the first and second ribs and located adjacent to the holes corresponding thereto.

3. The chain as claimed in claim 1, wherein the thickness of each of the first ribs increases from the retainer connected to the first rib toward a direction away from the retainer, the thickness of each of the second ribs increases from the retainer connected to the second rib toward a direction away from the retainer.

4. A chain for rolling elements, comprising:

a flat carrier belt having a first side strip and a second side strip on two sides thereof, multiple holes defined in the carrier belt and located between the first and second side strips, each hole having a first opening end and a second opening end, multiple retainers connected to the carrier belt and located alternatively with respect to the holes, multiple first ribs connected between the first side strip and the retainer, each of the first ribs located adjacent the hole corresponding thereto, multiple second ribs connected between the second side strip and the retainer, each of the second ribs located adjacent the hole corresponding thereto, each of the first and second side strips having a thickness T1, and each of the first and second ribs having a thickness T2 which is smaller than T1, wherein the thickness of each of the first and second ribs increases from a mediate portion of each of the first and second side strips toward the first and second opening ends of the hole.

5. The chain as claimed in claim 4, wherein a straight side or a curved side is formed on the first and second ribs and located adjacent to the holes corresponding thereto.

6. The chain as claimed in claim 4, wherein the thickness of each of the first ribs increases from the retainer connected to the first rib toward a direction away from the retainer, the thickness of each of the second ribs increases from the retainer connected to the second rib toward a direction away from the retainer.

* * * * *